(12) United States Patent
Casasanta et al.

(10) Patent No.: US 9,956,850 B2
(45) Date of Patent: May 1, 2018

(54) KINETIC ENERGY HYBRID SYSTEM FOR TRANSPORT REFRIGERATION

(71) Applicant: Carrier Corporation, Farmington, CT (US)

(72) Inventors: James D. Casasanta, Auburn, NY (US); Benjamin E. Ferguson, Cazenovia, NY (US); Robert A. Chopko, Baldwinsville, NY (US)

(73) Assignee: Carrier Corporation, Jupiter, FL (US)

( * ) Notice: Subject to any disclaimer, the term of this patent is extended or adjusted under 35 U.S.C. 154(b) by 81 days.

(21) Appl. No.: 15/033,991

(22) PCT Filed: Oct. 2, 2014

(86) PCT No.: PCT/US2014/058755
§ 371 (c)(1),
(2) Date: May 3, 2016

(87) PCT Pub. No.: WO2015/065643
PCT Pub. Date: May 7, 2015

(65) Prior Publication Data
US 2016/0272048 A1    Sep. 22, 2016

Related U.S. Application Data

(60) Provisional application No. 61/899,638, filed on Nov. 4, 2013.

(51) Int. Cl.
*F25D 3/12* (2006.01)
*B60H 1/32* (2006.01)
(Continued)

(52) U.S. Cl.
CPC ....... *B60H 1/3222* (2013.01); *B60H 1/00014* (2013.01); *B60H 1/0045* (2013.01);
(Continued)

(58) Field of Classification Search
CPC ...... B60L 1/003; B60L 11/16; B60L 2240/36; B60H 1/3222; B60H 1/0045;
(Continued)

(56) References Cited

U.S. PATENT DOCUMENTS 2,962,873 A * 12/1960 Anderson ............ B60H 1/3222
62/134
4,128,020 A   12/1978 Gray
(Continued)

OTHER PUBLICATIONS

International Search Report and Written Opinion for PCT/US2014/058755, dated Mar. 10, 2015.
(Continued)

*Primary Examiner* — Len Tran
*Assistant Examiner* — Ana Vazquez
(74) *Attorney, Agent, or Firm* — Bachman & LaPointe, P.C.

(57) ABSTRACT

A system (20) is operable in a plurality of modes. The system has: a container (22) having an interior (24); an internal combustion engine (66); a refrigeration system (30) and a flywheel energy storage device (70). In at least one mode, the refrigeration system coupled to the internal combustion engine to receive power and thermally coupled to the container to cool the container interior. In at least one mode, the energy storage device coupled to the internal combustion engine to receive power from the internal combustion engine. In at least one mode, the energy storage device coupled to deliver power to the refrigeration system.

22 Claims, 5 Drawing Sheets

(51) Int. Cl.
*B60P 3/20* (2006.01)
*B60L 11/16* (2006.01)
*F25B 27/00* (2006.01)
*H02K 7/02* (2006.01)
*B60H 1/00* (2006.01)
*B60L 1/00* (2006.01)
*F02B 63/00* (2006.01)

(52) U.S. Cl.
CPC ....... *B60H 1/00378* (2013.01); *B60H 1/3232* (2013.01); *B60L 1/003* (2013.01); *B60L 11/16* (2013.01); *B60P 3/20* (2013.01); *F02B 63/00* (2013.01); *F25B 27/00* (2013.01); *H02K 7/025* (2013.01); *B60L 2200/36* (2013.01); *B60L 2240/36* (2013.01); *Y02E 60/16* (2013.01); *Y02T 10/641* (2013.01); *Y02T 10/7027* (2013.01); *Y02T 10/7033* (2013.01)

(58) Field of Classification Search
CPC ............ B60H 1/00364; B60H 1/00014; B60H 1/3232; B60H 1/00378; F02B 63/00; F25B 27/00; H02K 7/025; Y02E 60/16; B60P 3/20; Y02T 10/7027; Y02T 10/7033; Y02T 10/641
See application file for complete search history.

(56) References Cited

U.S. PATENT DOCUMENTS

| | | | |
|---|---|---|---|
| 4,588,040 A | 5/1986 | Albright, Jr. et al. | |
| 5,140,826 A | 8/1992 | Hanson et al. | |
| 5,629,568 A | 5/1997 | Mertens | |
| 8,337,359 B2 | 12/2012 | Hofbauer | |
| 2002/0056993 A1* | 5/2002 | Kennedy | B60R 16/04 290/1 A |
| 2007/0182245 A1 | 8/2007 | DuCharme | |
| 2010/0305794 A1 | 12/2010 | Foster | |
| 2011/0094807 A1 | 4/2011 | Pruitt et al. | |
| 2011/0140455 A1* | 6/2011 | Wiggins | H02K 7/025 290/1 R |
| 2011/0193346 A1 | 8/2011 | Guzman et al. | |
| 2011/0256972 A1 | 10/2011 | Greenwood | |
| 2011/0294620 A1 | 12/2011 | Pruitt et al. | |
| 2012/0025032 A1 | 2/2012 | Hopdjanian et al. | |
| 2012/0139260 A1 | 6/2012 | Dunne | |
| 2012/0152635 A1 | 6/2012 | Hartjen, III | |
| 2013/0000342 A1 | 1/2013 | Blasko et al. | |
| 2013/0012421 A1 | 1/2013 | Smith | |
| 2013/0081498 A1 | 4/2013 | Serkh et al. | |
| 2013/0158828 A1 | 6/2013 | McAlister | |
| 2013/0199362 A1 | 8/2013 | Hoover | |

OTHER PUBLICATIONS

P.P. Acarnley et al., "Design Principles for a Flywheel Energy Store for Road Vehicles", IEEE Transactions on Industry Applications, Oct. 8, 1995, 672-678, vol. 32, Issue 6, IEEE, Piscataway, New Jersey.

Richard F. Post et al., "Flywheels", Scientific American, Dec. 1973, pp. 17-23, vol. 229, Issue 6, Scientific American, New York, New York.

"Flex PowerTM Option Makes Carrier Transicold's VectorTM Units More Versatile Than Ever", Press Release, Dec. 11, 2012, Carrier Transicold, Athens, Georgia.

* cited by examiner

KINETIC ENERGY HYBRID SYSTEM FOR TRANSPORT REFRIGERATION

CROSS-REFERENCE TO RELATED APPLICATION

Benefit is claimed of U.S. Patent Application Ser. No. 61/899,638, filed Nov. 4, 2013, and entitled "Kinetic Energy Hybrid System for Transport Refrigeration", the disclosure of which is incorporated by reference herein in its entirety as if set forth at length.

BACKGROUND

The disclosure relates to transport refrigeration. More particularly, the disclosure relates to air handling in transport refrigeration systems.

Transport refrigeration systems include cargo/shipping containers, trailers, and trucks. Each involves one or more refrigerated compartment in the container, truck box, or trailer box (collectively, "container") and a refrigeration system positioned to cool a recirculating airflow within the compartment. Depending upon the implementation, refrigeration equipment may be mounted to an exterior of the container or within a subcompartment in the container.

Many truck and trailer configurations mount the equipment to the front of the container, often high on the front wall so that the outlet for discharging cooled air into the compartment is near the compartment ceiling.

The refrigeration equipment typically comprises a vapor compression system having: a compressor; a heat rejection heat exchanger (e.g., a condenser or gas cooler) downstream of the compressor along a cooling mode refrigerant flowpath; an expansion device downstream of the compressor along the cooling mode refrigerant flowpath; and a heat absorption heat exchanger (evaporator) downstream of the expansion device along the cooling mode refrigerant flowpath.

In some systems, the compressor is driven by an electric motor (either as the normal drive source or in standby operation). A generator system (e.g., having an internal combustion engine driving a generator) may be used to power the electric motor. Such systems may have the capability for plug-in operation powered by an external power source. External power may be used such as when a truck or trailer is parked.

Separately, kinetic energy recovery systems (KERS) have been developed for vehicle powertrains. One select example is a flywheel system of Volvo Car Corporation.

SUMMARY

One aspect of the disclosure involves a system operable in a plurality of modes. The system comprises a container having an interior; an internal combustion engine; a refrigeration system; and a flywheel energy storage device. In at least one said mode, the refrigeration system is coupled to the internal combustion engine to receive power and thermally coupled to the container to cool the container interior. In at least one said mode, the flywheel energy storage device is coupled to the internal combustion engine to receive power from the internal combustion engine. In at least one said mode, the flywheel energy storage device is coupled to deliver power to the refrigeration system.

In one or more embodiments of any of the foregoing embodiments, the refrigeration system is a vapor compression system comprising: a compressor; a heat rejection heat exchanger downstream of the compressor along a cooling mode refrigerant flowpath; an expansion device downstream of the heat rejection heat exchanger along the cooling mode refrigerant flowpath; and a heat absorption heat exchanger downstream of the expansion device along the cooling mode refrigerant flowpath and thermally coupled to the container.

In one or more embodiments of any of the foregoing embodiments, the system further comprises an electric motor in at least one said mode coupled to the compressor to drive the compressor.

In one or more embodiments of any of the foregoing embodiments, the system further comprises a generator, in at least one said mode: coupled to the internal combustion engine to be driven by the internal combustion engine; and coupled to the electric motor to power the electric motor to drive the compressor.

In one or more embodiments of any of the foregoing embodiments, the generator is in addition to a generator providing electrical energy to the internal combustion engine.

In one or more embodiments of any of the foregoing embodiments, the system further comprises a belt coupling the electric motor and the flywheel energy storage device to the compressor and the engine.

In one or more embodiments of any of the foregoing embodiments, the internal combustion engine is coupled to mechanically drive the compressor in at least one said mode.

In one or more embodiments of any of the foregoing embodiments, the system further comprises a clutch mechanically coupling the internal combustion engine to the compressor in at least one said mode.

In one or more embodiments of any of the foregoing embodiments, the system further comprises a belt coupling the refrigeration system and the flywheel energy storage device to the engine.

In one or more embodiments of any of the foregoing embodiments, the system further comprises the flywheel energy storage device having magnetic bearings.

In one or more embodiments of any of the foregoing embodiments, the system further comprises an electrical connection for connecting to an external electric power source.

In one or more embodiments of any of the foregoing embodiments, the system further comprises a continuously variable transmission coupled to the flywheel energy storage device.

In one or more embodiments of any of the foregoing embodiments, the engine is not a propulsion engine.

In one or more embodiments of any of the foregoing embodiments, the container is: a truck cargo box; a trailer box; or an intermodal container.

In one or more embodiments of any of the foregoing embodiments, the system further comprises a controller configured to: operate the system in a normal energy-storing mode wherein the internal combustion engine supplies power to the refrigeration system; and the internal combustion engine supplies power to charge the flywheel energy storage device; and operate the system in a recovered energy mode wherein the flywheel energy storage device discharges to power the refrigeration system.

In one or more embodiments of any of the foregoing embodiments, the controller is further configured to: vary a ratio of a continuously variable transmission to control a charging or a discharging of the flywheel energy storage device.

In one or more embodiments of any of the foregoing embodiments, a method for using the system comprises:

operating the system in a normal energy-storing mode wherein the internal combustion engine supplies power to the refrigeration system; and the internal combustion engine supplies power to charge the flywheel energy storage device; and operating the system in a recovered energy mode wherein the flywheel energy storage device discharges to power the refrigeration system.

In one or more embodiments of any of the foregoing embodiments, the method further comprises operating the system in a plugged-in standby energy storing mode wherein an external electric power source powers the refrigeration system and stores energy in the flywheel energy storage device.

In one or more embodiments of any of the foregoing embodiments, the method further comprises operating the system in a plugged-in standby recovered energy mode wherein the external electric power source powers the refrigeration system and the flywheel energy storage device discharges to power the refrigeration system.

In one or more embodiments of any of the foregoing embodiments, the method comprises switching between the recovered energy mode and the energy storing mode by varying a ratio of a continuously variable transmission.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
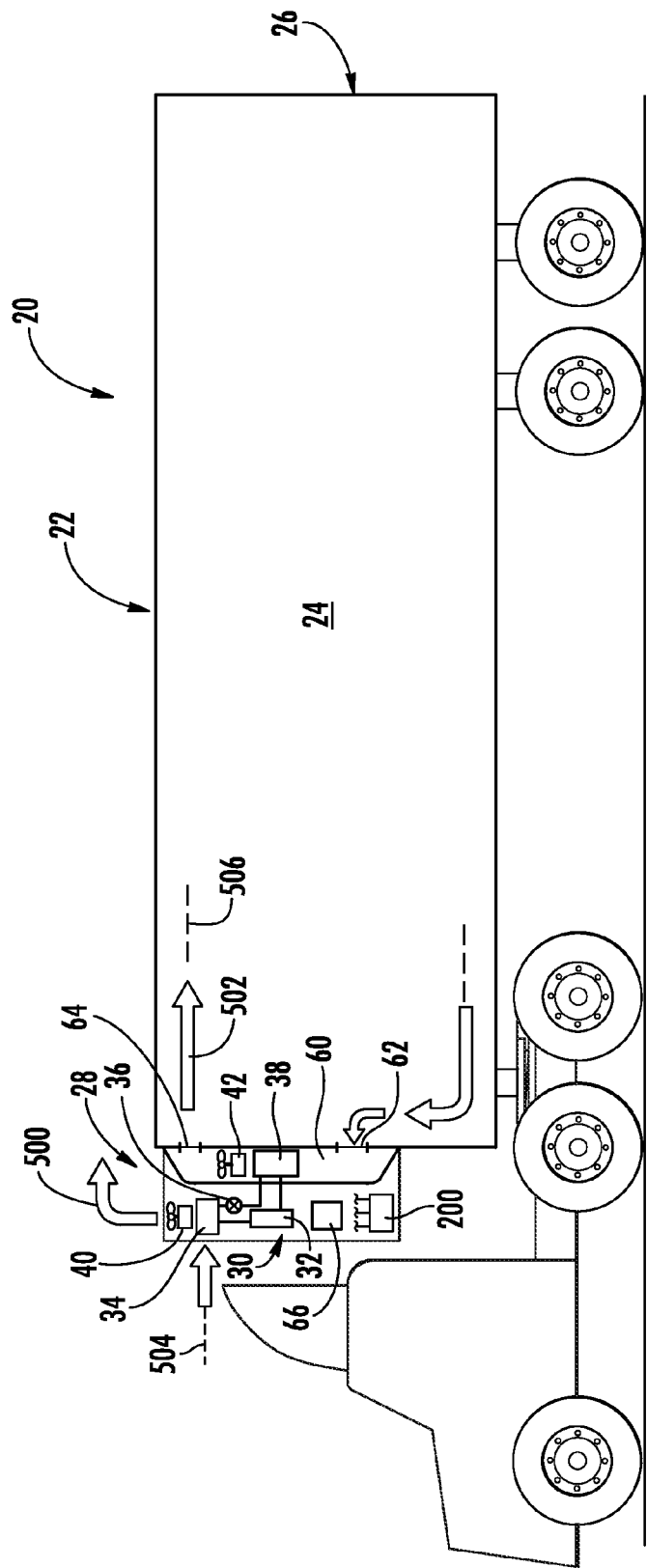
FIG. 1 is a partially schematic view of a refrigerated transport system.

FIG. 1 shows a refrigerated transport system in the form of a trailer 20 having a container in the form of box 22 with an interior 24. In the exemplary box, a pair of doors 26 are formed at a rear of the box. An equipment compartment 28 is located along a front of the box and contains the refrigeration system 30.

The exemplary refrigeration system 30 includes a vapor compression system comprising a compressor 32. Sequentially downstream of the compressor along the refrigerant flowpath are a heat rejection heat exchanger 34 (e.g., condenser or gas cooler), an expansion device 36 (e.g., electronic expansion valve (EEV)), and a heat absorption heat exchanger (evaporator) 38. These are connected via an appropriate refrigerant line. The exemplary heat exchangers are refrigerant-air heat exchangers and may have associated fans 40, 42 driving air flows thereacross. An exemplary air flow across the condenser 34 is shown as 500 and an exemplary air flow across the evaporator is shown as 502. Exemplary air flow 500 passes along a flowpath 504 entering from and exiting to the surrounding atmosphere. The exemplary flow 502 is along a recirculating flowpath entering from and returning to the interior 24. The flow 502 passes through a duct 60 having an inlet 62 and an outlet 64 to the interior 24.

The system comprises a power source which may comprise an internal combustion engine (ICE) 66. In various implementations, the power source may be in the equipment box. The engine may mechanically drive the compressor or may drive an electric generator to, in turn, power the compressor and fan(s).

Figure 2:
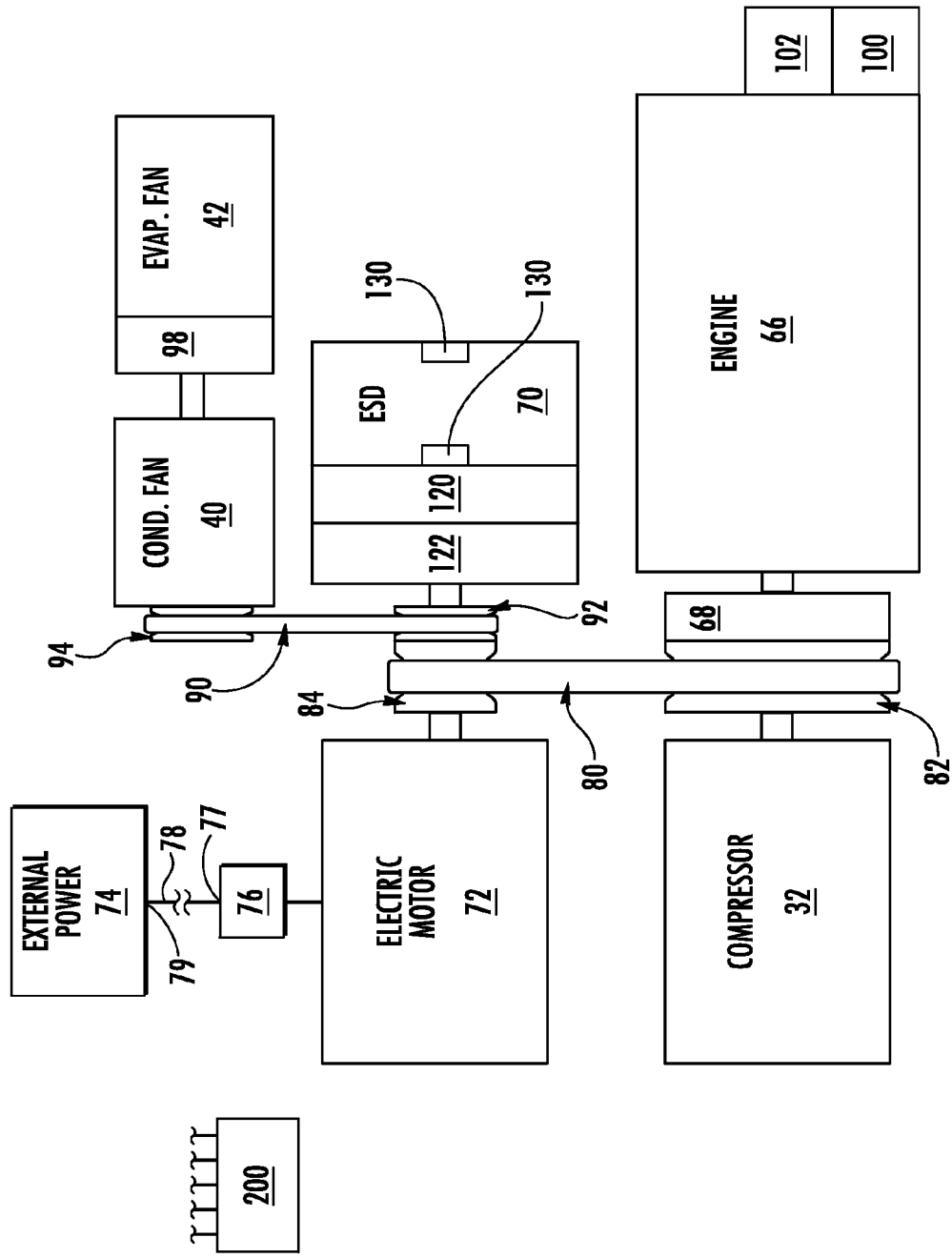
FIG. 2 is a schematic view of a system for powering a compressor of the system of FIG. 1.

FIG. 2 shows further details of a first embodiment wherein the engine is mechanically coupled to the compressor to drive the compressor. The exemplary engine is coupled to the compressor via a clutch 68. The exemplary clutch 68 is a centrifugal clutch or an electronically controlled clutch controlled by a system controller 200, discussed below. The exemplary compressor and engine are coaxial, sharing a central longitudinal axis with the clutch 68. In the exemplary first embodiment, the fans 40 and 42 are mechanically driven as is discussed further below. The system further includes a flywheel energy storage device (ESD) 70 (flywheel unit) and an electric motor 72 (standby motor). The exemplary electric motor 72 may be used for standby operation powered by an external power source 74. Exemplary external power sources 74 include plug-in AC power at a warehouse, storage facility, parking lot, rest area, and the like. In this example, the standby motor 72 is an AC motor. Power electronics (box) 76 may intervene between the external power source 74 and electric motor and may perform any of several functions including voltage conversions, switching, surge protection, and the like. Electrical connections to the external power source 74 and between components are schematically shown with a single line. However, they would have an appropriate number of conductors to correspond to the type of power being transmitted. The exemplary power transmission is three-phase AC power. The power line 78 may have plugs at opposite ends connecting to receptacles 77 and 79 on the power electronics box 76 and the external power source 74.

The standby motor 72 may be coupled to drive the compressor in one or more modes discussed below. The term "mode" may be used at a number of levels from an instantaneous operating state or condition to a broad operational mode that may include the controller shifting the system through a number of conditions or modes (submodes). The exemplary coupling is via a belt 80 over-wrapping respective sheaves 82 and 84 of the compressor 32 and standby motor 72. In the exemplary mechanically-powered fan embodiment, the fans 40 and 42 may also be belt driven. The exemplary fans are driven in common by a single belt 90. The exemplary belt 90 over-wraps a driving sheave 92. The exemplary driving sheave 92 is mounted to the motor sheave 84 to rotate therewith as a unit or may otherwise be integrally or unitarily formed therewith.

In the exemplary embodiment, the condenser fan 40 is driven by the belt 90 and runs whenever the system is running. The exemplary evaporator fan 42, however, is coupled by a clutch 98 to be selectively disengagable and engagable. The disengagability, for example, may aid in defrosting. The exemplary flywheel unit 70 is coupled to remaining system components by a transmission 120 and a clutch 122. The exemplary transmission 120 is a continuously variable transmission (CVT) (e.g., planetary or belt) whose gear ratio may be controlled by the controller 200. The clutch may similarly be controlled to lock and unlock by the controller 200.

The engine 66 may have integrated therewith or otherwise associated therewith a number of sub-systems which may include an alternator or electrical generator 100 and a battery 102 to provide and store electrical energy for operating the engine (e.g., powering engine controls, powering spark plugs or glow plugs, and the like). The exemplary flywheel unit 70 may be enclosed in a vacuum environment and supported by magnetic (inclusive of electromagnetic) bearings 130.

Table I below shows a number of possible instantaneous operating conditions. Typically a standard or normal operating mode is characterized by Condition 1 of Table I. In that condition, the engine is running and the clutch 68 is closed, locked or engaged so that the engine mechanically drives the compressor. In the basic condition, the standby motor freely rotates (freewheels) driven by the engine via the belt 80 but is neither electrically powered to add energy nor used as a generator to withdraw energy. Clutch 122 is open/unlocked/disengaged so that the flywheel unit 70 coasts (and may slowly decay in its rotational speed and stored energy due to residual friction). The clutch 98 may be closed/locked/engaged so that both fans run.

Two variations on this normal mode involve closing/locking/engaging the clutch 122. In Condition 2 of Table I (to be referred to as a standard energy-storing or charging condition) energy from the engine is being stored in the unit 70 by increasing the speed of the flywheel. In Condition 3 of Table I (to be referred to as a standard boosting condition), energy is extracted from the unit 70 by decreasing flywheel speed to add to the power of the engine 66 to drive the compressor allowing the engine to use less fuel and/or with more power than the engine alone produces. Between charging and boosting conditions is controlled by controlling the gear ratio of the transmission 120 by the controller 200. The same may be true for any other conditions discussed below wherein there is a basic operating condition and a charging variant and a boosting variant.

Further variations on the three foregoing conditions are defrost variations (Conditions 1A-3A of Table I). In the defrost variation in any of the foregoing conditions, compressed refrigerant may be delivered from the compressor to the evaporator (e.g., via valves (not shown) to bypass the condenser). Controller 200 may also open/disengage/unlock the clutch 98 to turn off the evaporator fan 42.

Another basic condition is a plugged-in standby condition shown as Condition 4 in Table I. In this condition, the system is plugged into the external power source 74 to electrically drive the standby motor 72. Engine 66 is off and clutch 68 is open/unlocked/disengaged so that driving of the belt 80 via the motor 72 drives the compressor but not the engine. Within the basic plugged-in standby condition, there are the same charging and boosting variants (Conditions 5 and 6) and normal and defrost variants (Conditions 4A-6A) as in the normal operating condition. These similarly are shown in Table I.

Other conditions are possible. A further exemplary condition or set of conditions involves using only the flywheel unit 70 for power by depleting its kinetic (rotational) energy. The engine may be off and the clutch 68 unlocked and the clutch 122 is locked such that the unit 70 powers the compressor via the belt 80. Such a mode is shown in Condition 7 of Table I. In this basic kinetic energy mode, the motor 72 is unpowered, acting as neither as a motor nor a generator. A defrost variant of this kinetic energy mode is shown as Condition 7A. By definition, there would be no charging variants of a kinetic energy depleting mode.

FIG. 1 further shows a controller 200. The controller may receive user inputs from an input device (e.g., switches, keyboard, or the like) and sensors (not shown, e.g., pressure sensors and temperature sensors at various system locations). The controller may be coupled to the sensors and controllable system components (e.g., valves, the bearings, the compressor motor, vane actuators, and the like) via control lines (e.g., hardwired or wireless communication paths). The controller may include one or more: processors; memory (e.g., for storing program information for execution by the processor to perform the operational methods and for storing data used or generated by the program(s)); and hardware interface devices (e.g., ports) for interfacing with input/output devices and controllable system components.

TABLE I

Exemplary Operating Conditions of First Embodiment

| Mode | Instantaneous Operating Condition | ICE | ICE Clutch | Compressor | External Power | Standby Motor | KERS Clutch | Flywheel | Fan Clutch |
|---|---|---|---|---|---|---|---|---|---|
| 1 | Std | on | Locked | Running | Off | Unpowered | Unlocked | Coasting | Locked |
| 2 | Chrg | on | Locked | Running | Off | Unpowered | Locked | Charging | Locked |
| 3 | Std Boost | on | Locked | Running | Off | Unpowered | Locked | Discharging | Locked |
| 1A | Std Def | on | Locked | Running | Off | Unpowered | Unlocked | Coasting | Unlocked |
| 2A | Std Chrg Def | on | Locked | Running | Off | Unpowered | Locked | Charging | Unlocked |
| 3A | Std Boost Def | on | Locked | Running | Off | Unpowered | Locked | Discharging | Unlocked |
| 4 | Standby | off | Unlocked | Running | On | Powered | Unlocked | Coasting | Locked |
| 5 | Stby Chrg | off | Unlocked | Running | On | Powered | Locked | Charging | Locked |
| 6 | Stby Boost | off | Unlocked | Running | On | Powered | Locked | Discharging | Locked |
| 4A | Stby Def | off | Unlocked | Running | On | Powered | Unlocked | Coasting | Unlocked |
| 5A | Stby Chrg Def | off | Unlocked | Running | On | Powered | Locked | Charging | Unlocked |
| 6A | Stby Boost Def | off | Unlocked | Running | On | Powered | Locked | Discharging | Unlocked |
| 7 | Kinetic | off | Unlocked | Running | Off | Unpowered | Locked | Discharging | Locked |
| 7A | Kinetic Def | off | Unlocked | Running | Off | Unpowered | Locked | Discharging | Unlocked |

A control routine may be programmed or otherwise configured into the controller. The routine may be superimposed upon the controller's normal programming/routines (not shown, e.g., providing the basic operation of a baseline system to which the foregoing control routine is added). An exemplary application involves a delivery truck or trailer that gets plugged into the external power source at night and is driven on a delivery route during the day. Accordingly, the discussion includes some aspects of the normal programming/routines. A starting point is assumed to be the beginning of the day when the system has been in plugged in standby mode. The user turns the unit on and sets the set-point temperature. The user unplugs unit from house power. The controller detects the state of flywheel charge and the set-point setting.

Based on sensor inputs, the controller determines which mode or submode to operate in (e.g., which of the standard modes 1-3 to operate in based on the magnitude of pulldown and availability of charge in the flywheel. For example, if the flywheel has sufficient charge and the pulldown need is great, the controller closes the flywheel clutch so the flywheel system can assist the ICE for pulldown (mode 3). The controller adjusts power from the ICE and flywheel system until the set-point is reached or flywheel power is exhausted.

If charge is low and pulldown need is low, the clutch may also be closed but the flywheel may charge (mode 2—the charge or discharge being controlled by the CVT).

Otherwise, the controller may operate in mode 1. In continued standard operation, the controller may continuously switch between modes 1-3 based upon cooling need and flywheel charge state.

The system may enter standard defrost mode according to the baseline programming, with the addition of switching between modes 1A-3A in a similar fashion to that described above.

In one shutdown scenario, the user plugs the unit in to external power and commands shut-down of the unit (the compressor may be made to freewheel or an additional clutch (not shown) may be opened to decouple it from the motor). The controller detects state of flywheel charge, the command to power down unit and that unit is plugged into the external power source. If the controller determines that the flywheel system needs charging, power is directed to charge the flywheel for future needs. The electric motor may be shut off and restarted if needed.

A similar non-shut-down standby mode may similarly be entered by the user just plugging in and optionally commanding that mode. The controller balances use of energy from the motor for charging the flywheel as needed and cooling the compartment (e.g., maintaining set point as in standard mode). In other variations wherein the compressor motor is separate from that charging the flywheel, a similar balancing of electric power may occur.

Relative to the standard modes, the logic in switching between these standby modes may be more biased in favor of keeping the flywheel fully charged. The standard mode switching logic may be biased in favor of minimizing fuel use or emissions. For example with normal cooling loads and the compressor consuming a normal amount of engine power, it may be not be desired to run the engine at high power just to charge the flywheel. Charging might be reserved for lower cooling load situations. However in standby mode, there is less downside (if any) to using whatever electrical capacity exceeds cooling needs to charge the flywheel.

As noted in the table, defrost variations of standby mode may be entered by the controller (e.g., in response to detected frost or at regular intervals).

The kinetic modes 7 and 7A may be entered in various transitional situations. For example, they could be used to delay engine start upon unplugging from standby or expedite engine shutdown prior to standby.

Table II below shows modes of a variant of the first embodiment lacking standby operation.

TABLE II

Exemplary Operating Conditions of Non-Standby First Embodiment

| | Instantaneous | Component | | | | | | |
|---|---|---|---|---|---|---|---|---|
| Mode | Operating Condition | ICE | ICE Clutch | Compressor | External Power | KERS Clutch | Flywheel | Fan Clutch |
| 1 | Std | on | Locked | Running | Off | Unlocked | Coasting | Locked |
| 2 | Chrg | on | Locked | Running | Off | Locked | Charging | Locked |
| 3 | Std Boost | on | Locked | Running | Off | Locked | Discharging | Locked |
| 1A | Std Def | on | Locked | Running | Off | Unlocked | Coasting | Unlocked |
| 2A | Std Chrg Def | on | Locked | Running | Off | Locked | Charging | Unlocked |
| 3A | Std Boost Def | on | Locked | Running | Off | Locked | Discharging | Unlocked |
| 7 | Kinetic | off | Unlocked | Running | Off | Locked | Discharging | Locked |
| 7A | Kinetic Def | off | Unlocked | Running | Off | Locked | Discharging | Unlocked |

Figure 3:
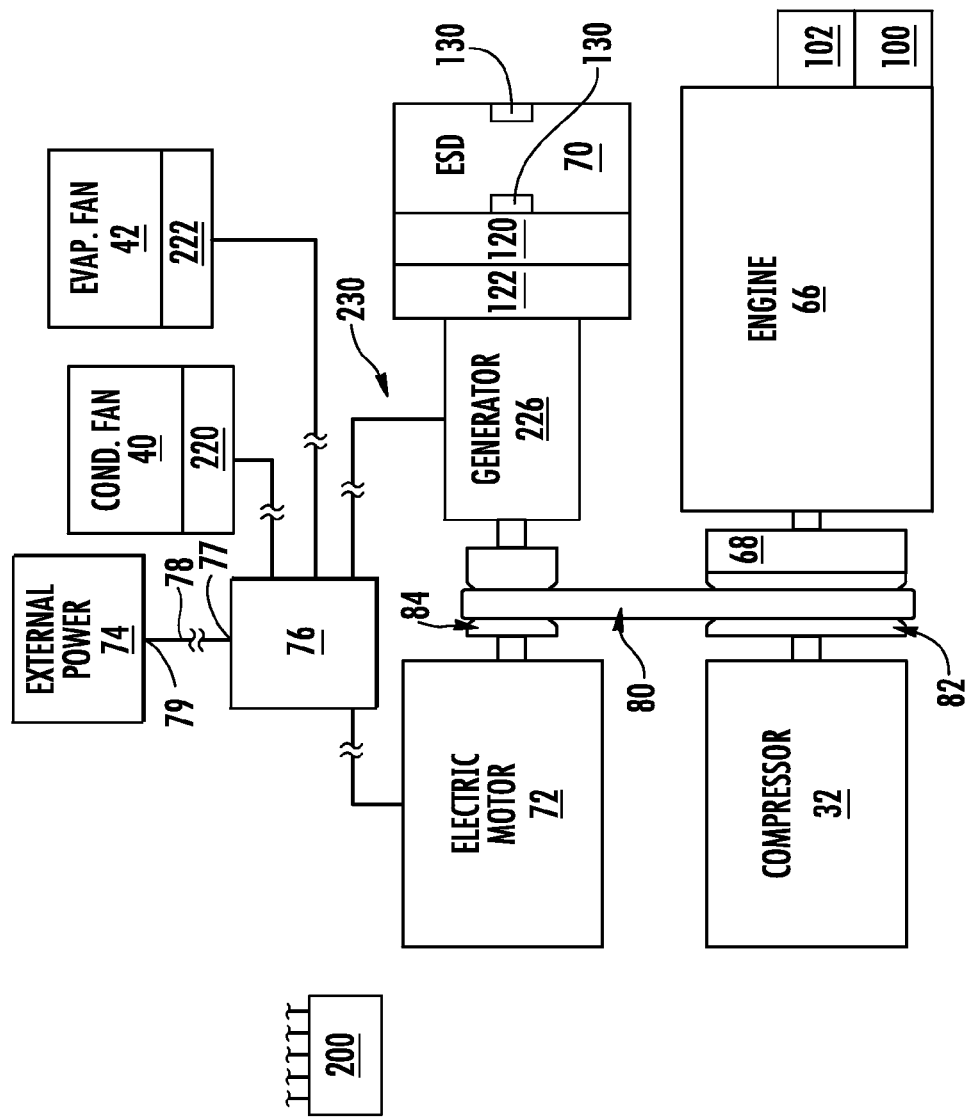
FIG. 3 is a schematic view of a second system for powering a compressor of the system of FIG. 1.

FIG. 3 shows a further variation on the system with enhanced electrification. In the embodiment, the fans 40 and 42 are driven by electric motors 220 and 222. A generator 226 may be provided in addition to the standby motor 72. In further variations on this embodiment, the standby motor 72 and generator 226 can be combined into one motor/generator. A central power electronics control box is shown 76. Although shown as a separate control box, this may be integrated with the controller 200 in any of the embodiments. Additionally, the illustration of such a central control box in this embodiment does not preclude a similar box being associated with the other embodiments even if not therein illustrated. In the exemplary embodiments, power lines 230 provide power from the generator or external source 74 to the fan motors 220 and 222. An additional "kinetic fan" mode may be used such as when the unit fans need to run to circulate the load air delaying the need for the compressor to turn on. Tables III and IV show operating conditions for this embodiment and a non-standby variant.

TABLE III

Exemplary Operating Conditions of Second Embodiment

| | Instantaneous | Component | | | | | | | | |
|---|---|---|---|---|---|---|---|---|---|---|
| Mode | Operating Condition | ICE | ICE Clutch | Compressor | External Power | Standby Motor | KERS Clutch | Flywheel | Cond Fan | Evap Fan |
| 1 | Std | On | Locked | Running | Off | Unpowered | Unlocked | Coasting | Running | Running |
| 2 | Chrg | On | Locked | Running | Off | Unpowered | Locked | Charging | Running | Running |
| 3 | Std Boost | On | Locked | Running | Off | Unpowered | Locked | Discharging | Running | Running |
| 1A | Std Def | On | Locked | Running | Off | Unpowered | Unlocked | Coasting | Running | Off |
| 2A | Std Chrg Def | On | Locked | Running | Off | Unpowered | Locked | Charging | Running | Off |
| 3A | Std Boost Def | On | Locked | Running | Off | Unpowered | Locked | Discharging | Running | Off |
| 4 | Standby | Off | Unlocked | Running | On | Powered | Unlocked | Coasting | Running | Running |
| 5 | Stby Chrg | Off | Unlocked | Running | On | Powered | Locked | Charging | Running | Running |
| 6 | Stby Boost | Off | Unlocked | Running | On | Powered | Locked | Discharging | Running | Running |
| 4A | Stby Def | Off | Unlocked | Running | On | Powered | Unlocked | Coasting | Running | Off |
| 5A | Stby Chrg Def | Off | Unlocked | Running | On | Powered | Locked | Charging | Running | Off |
| 6A | Stby Boost Def | Off | Unlocked | Running | On | Powered | Locked | Discharging | Running | Off |
| 7 | Kinetic | Off | Unlocked | Running | Off | Unpowered | Locked | Discharging | Running | Running |
| 7A | Kinetic Def | Off | Unlocked | Running | Off | Unpowered | Locked | Discharging | Running | Off |
| 7B | Kinetic Fan | Off | Unlocked | Off | Off | Unpowered | Locked | Discharging | Off | Running |

TABLE IV

Exemplary Operating Conditions of Non-Standby Second Embodiment

| | Instantaneous | Component | | | | | | | |
|---|---|---|---|---|---|---|---|---|---|
| Mode | Operating Condition | ICE | ICE Clutch | Compressor | External Power | KERS Clutch | Flywheel | Cond Fan | Evap Fan |
| 1 | Std | On | Locked | Running | Off | Unlocked | Coasting | Running | Running |
| 2 | Chrg | On | Locked | Running | Off | Locked | Charging | Running | Running |
| 3 | Std Boost | On | Locked | Running | Off | Locked | Discharging | Running | Running |
| 1A | Std Def | On | Locked | Running | Off | Unlocked | Coasting | Running | Off |
| 2A | Std Chrg Def | On | Locked | Running | Off | Locked | Charging | Running | Off |
| 3A | Std Boost Def | On | Locked | Running | Off | Locked | Discharging | Running | Off |
| 7 | Kinetic | Off | Unlocked | Running | Off | Locked | Discharging | Running | Running |
| 7A | Kinetic Def | Off | Unlocked | Running | Off | Locked | Discharging | Running | Off |
| 7B | Kinetic Fan | Off | Unlocked | Off | Off | Locked | Discharging | Off | Running |

Figure 4:
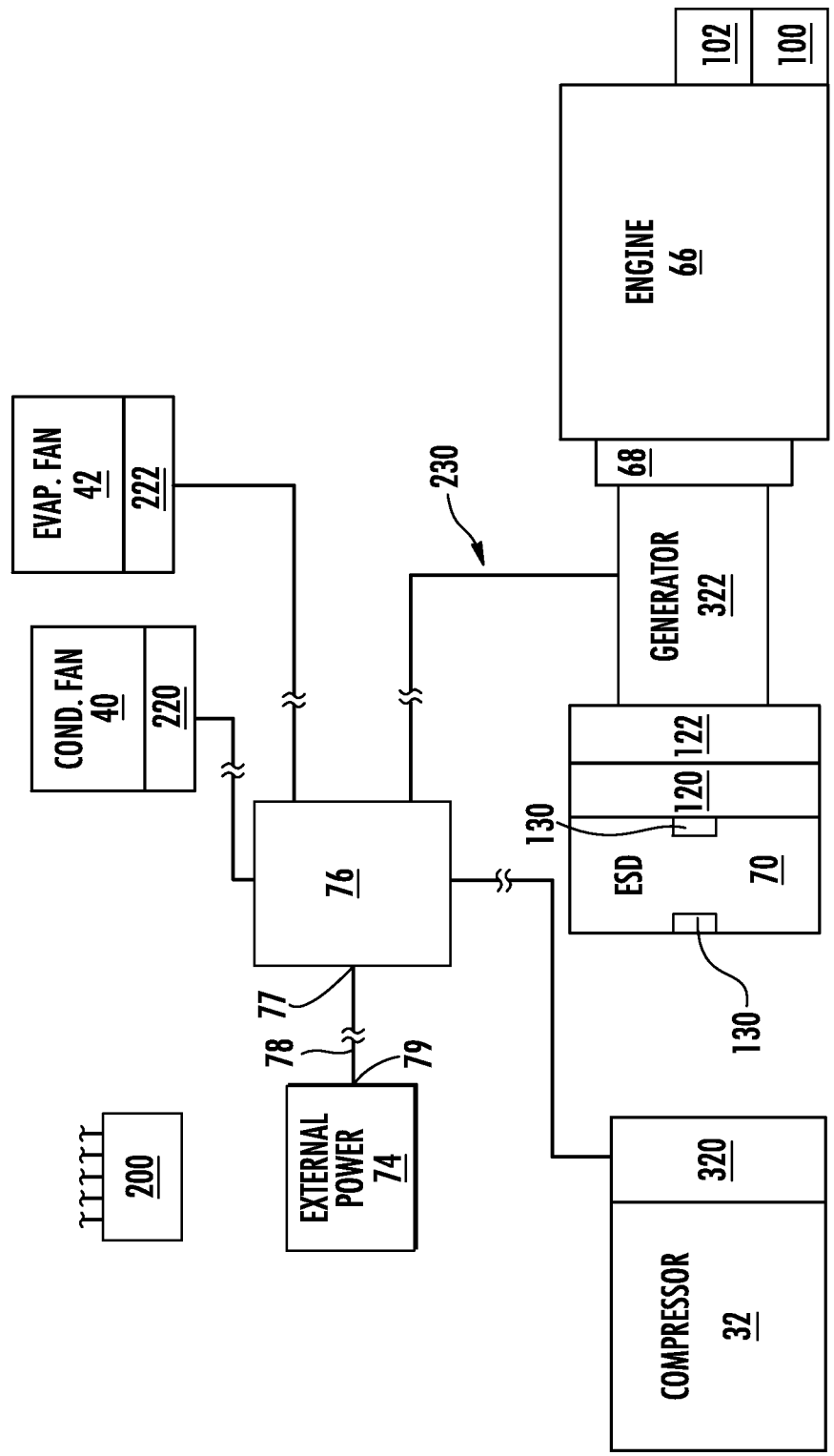
FIG. 4 is a schematic view of a third system for powering a compressor of the system of FIG. 1.

FIG. 4 shows a further electrified embodiment wherein there is no mechanical coupling of the engine to the compressor. Instead the compressor is driven by an electric motor 320. In this exemplary embodiment, electric motor 320 is shown integrated with the compressor (e.g., with the motor coaxially directly driving compressor working elements (e.g., a crankshaft of a reciprocating compressor or a scroll, screw, or impeller of another compressor)). Elements which are likely to be shared with the other embodiments are referenced with like numerals. The engine 66 directly drives a generator 322 so as to power system components including the exemplary electric fans and the compressor motor. The exemplary flywheel unit 70 is coupled to the generator by the transmission 120 and clutch 122. This may be without intervening means such as a belt or with such further intervening means. Thus, with clutches 68 and 122 closed/locked, the engine can also drive/charge the flywheel unit or the flywheel unit can discharge to drive the generator with more power than provided by the engine alone. Opening of the clutch 68 decouples the engine from the generator and allows the flywheel unit alone to drive the generator. Table V shows operating conditions for this embodiment.

TABLE V

Exemplary Operating Conditions of Third Embodiment

| | Instantaneous | Component | | | | | | | |
|---|---|---|---|---|---|---|---|---|---|
| Mode | Operating Condition | ICE | Compressor | External Power | Standby Motor | KERS Clutch | Flywheel | Cond Fan | Evap Fan |
| 1 | Std | On | Running | Off | Unpowered | Unlocked | Coasting | Running | Running |
| 2 | Chrg | On | Running | Off | Unpowered | Locked | Charging | Running | Running |
| 3 | Std Boost | On | Running | Off | Unpowered | Locked | Discharging | Running | Running |
| 1A | Std Def | On | Running | Off | Unpowered | Unlocked | Coasting | Running | Off |
| 2A | Std Chrg Def | On | Running | Off | Unpowered | Locked | Charging | Running | Off |
| 3A | Std Boost Def | On | Running | Off | Unpowered | Locked | Discharging | Running | Off |
| 4 | Standby | Off | Running | On | Powered | Unlocked | Coasting | Running | Running |
| 5 | Stby Chrg | Off | Running | On | Powered | Locked | Charging | Running | Running |

TABLE V-continued

Exemplary Operating Conditions of Third Embodiment

| | Instantaneous | Component | | | | | | | |
|---|---|---|---|---|---|---|---|---|---|
| Mode | Operating Condition | ICE | Compressor | External Power | Standby Motor | KERS Clutch | Flywheel | Cond Fan | Evap Fan |
| 6 | Stby Boost | Off | Running | On | Powered | Locked | Discharging | Running | Running |
| 4A | Stby Def | Off | Running | On | Powered | Unlocked | Coasting | Running | Off |
| 5A | Stby Chrg Def | Off | Running | On | Powered | Locked | Charging | Running | Off |
| 6A | Stby Boost Def | Off | Running | On | Powered | Locked | Discharging | Running | Off |
| 7 | Kinetic | Off | Running | Off | Unpowered | Locked | Discharging | Running | Running |
| 7A | Kinetic Def | Off | Running | Off | Unpowered | Locked | Discharging | Running | Off |
| 7B | Kinetic Fan | Off | Off | Off | Unpowered | Locked | Discharging | Off | Running |

Figure 5:
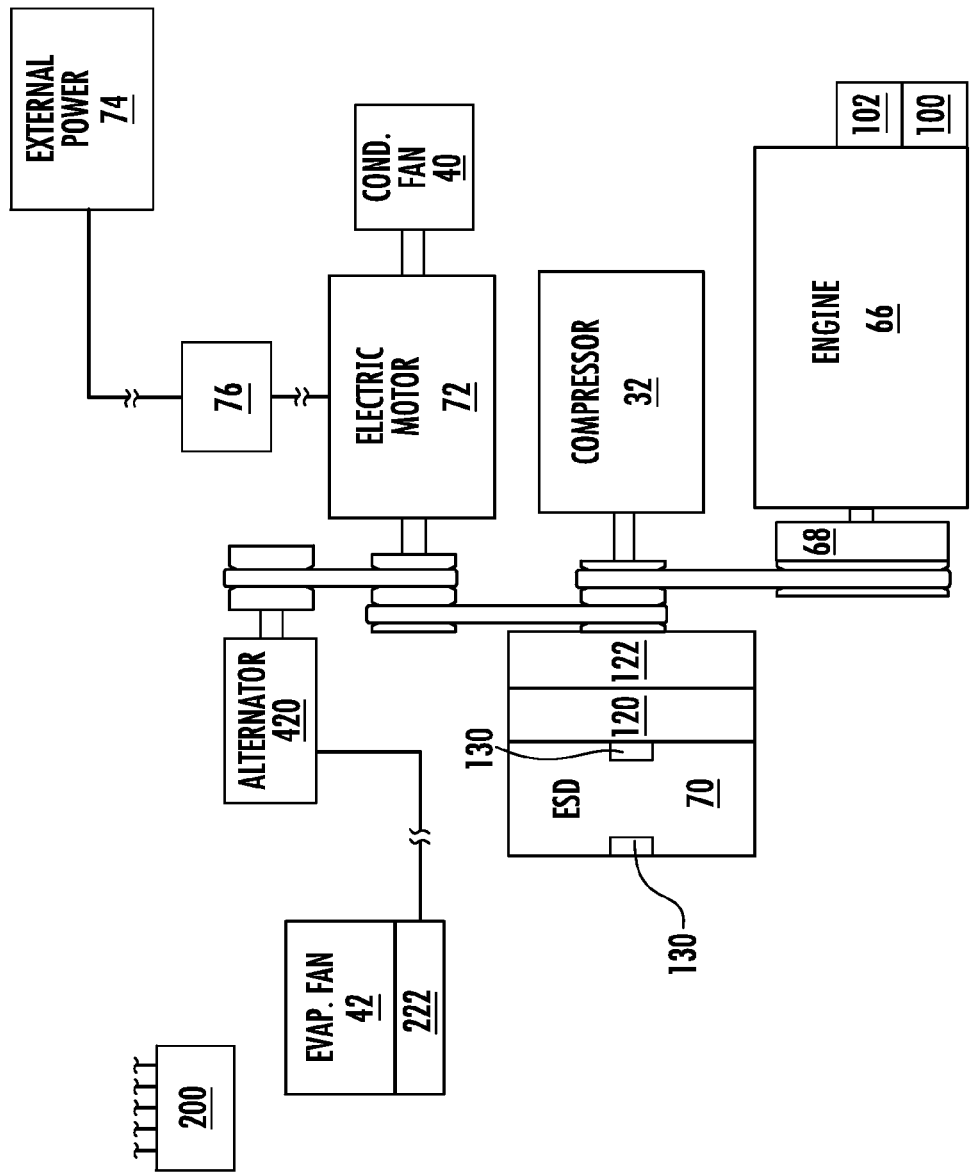
FIG. 5 is a schematic view of a fourth system for powering a compressor of the system of FIG. 1.

FIG. 5 shows a further embodiment with different powering of the two fans. The condenser fan 40 is mechanically powered whereas the evaporator fan 42 has its own motor 222. Exemplary motor 222 is a DC motor. To provide DC power, an alternator 420 may be provided. Again, this may be separate from the engine alternator or generator to allow the alternator to provide DC power when the engine is decoupled and the system is being driven by stored flywheel power and/or external power through the standby motor 72.

The exemplary FIG. 5 system has three belts (or sets thereof) coupling four separate rotating assemblies: the engine; the compressor and flywheel system; the standby motor and condenser fan; and the alternator. Tables VI and VII show operating conditions for this embodiment and a non-standby variant.

TABLE VI

Exemplary Operating Conditions of Fourth Embodiment

| | Instantaneous | Component | | | | | | | |
|---|---|---|---|---|---|---|---|---|---|
| Mode | Operating Condition | ICE | ICE Clutch | Compressor | External Power | Standby Motor | KERS Clutch | Flywheel | Fan Clutch |
| 1 | Std | On | Locked | Running | Off | Unpowered | Unlocked | Coasting | Locked |
| 2 | Chrg | On | Locked | Running | Off | Unpowered | Locked | Charging | Locked |
| 3 | Std Boost | On | Locked | Running | Off | Unpowered | Locked | Discharging | Locked |
| 1A | Std Def | On | Locked | Running | Off | Unpowered | Unlocked | Coasting | Unlocked |
| 2A | Std Chrg Def | On | Locked | Running | Off | Unpowered | Locked | Charging | Unlocked |
| 3A | Std Boost Def | On | Locked | Running | Off | Unpowered | Locked | Discharging | Unlocked |
| 4 | Standby | Off | Unlocked | Running | On | Powered | Unlocked | Coasting | Locked |
| 5 | Stby Chrg | Off | Unlocked | Running | On | Powered | Locked | Charging | Locked |
| 6 | Stby Boost | Off | Unlocked | Running | On | Powered | Locked | Discharging | Locked |
| 4A | Stby Def | Off | Unlocked | Running | On | Powered | Unlocked | Coasting | Unlocked |
| 5A | Stby Chrg Def | Off | Unlocked | Running | On | Powered | Locked | Charging | Unlocked |
| 6A | Stby Boost Def | Off | Unlocked | Running | On | Powered | Locked | Discharging | Unlocked |
| 7 | Kinetic | Off | Unlocked | Running | Off | Unpowered | Locked | Discharging | Locked |
| 7A | Kinetic Def | Off | Unlocked | Running | Off | Unpowered | Locked | Discharging | Unlocked |

TABLE VII

Exemplary Operating Conditions of Non-Standby Fourth Embodiment

| | Instantaneous | Component | | | | | | |
|---|---|---|---|---|---|---|---|---|
| Mode | Operating Condition | ICE | ICE Clutch | Compressor | External Power | KERS Clutch | Flywheel | Fan Clutch |
| 1 | Std | On | Locked | Running | Off | Unlocked | Coasting | Locked |
| 2 | Chrg | On | Locked | Running | Off | Locked | Charging | Locked |
| 3 | Std Boost | On | Locked | Running | Off | Locked | Discharging | Locked |
| 1A | Std Def | On | Locked | Running | Off | Unlocked | Coasting | Unlocked |
| 2A | Std Chrg Def | On | Locked | Running | Off | Locked | Charging | Unlocked |
| 3A | Std Boost Def | On | Locked | Running | Off | Locked | Discharging | Unlocked |
| 7 | Kinetic | Off | Unlocked | Running | Off | Locked | Discharging | Locked |
| 7A | Kinetic Def | Off | Unlocked | Running | Off | Locked | Discharging | Unlocked |

In any of the foregoing embodiments, various different relative positionings of the pulleys and groupings of what components are co-spooled permit different packaging configurations. For example, it may be easy to position the condenser and its associated mechanically-driven fan near the standby motor while a more remote evaporator is facilitated by electric powering of an evaporator motor. This also, for example, facilitates multiple evaporator situations such as would be present with multiple refrigerated compartments and with other remote evaporator uses.

Clearly, other variations are possible. For example, additional clutches may be added at various locations in the system to allow components to coast or simply be stopped when not in use rather than freewheeling and representing a parasitic loss. However, the costs of such clutches may be weighed against the amount of parasitic loss they would save. The saved parasitic loss reflects the nature and size of the component in question and the percentage of time is not a use and therefore would be either freewheeling or coasting depending upon the presence of a clutch.

The use of "first", "second", and the like in the description and following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing basic system, details of such configuration or its associated use may influence details of particular implementations. Accordingly, other embodiments are within the scope of the following claims.

What is claimed is:

1. A system (20) operable in a plurality of modes, the system comprising:
 a container (22) having an interior (24);
 an internal combustion engine (66);
 a refrigeration system (30), in at least one said mode coupled to the internal combustion engine to receive power and thermally coupled to the container to cool the container interior, the refrigeration system being a vapor compression system comprising:
  a compressor (32);
  a heat rejection heat exchanger (34) downstream of the compressor along a cooling mode refrigerant flowpath;
  an expansion device (36) downstream of the heat rejection heat exchanger along the cooling mode refrigerant flowpath; and
  a heat absorption heat exchanger (38) downstream of the expansion device along the cooling mode refrigerant flowpath and thermally coupled to the container;
 a flywheel energy storage device (70):
  in at least one said mode coupled to the internal combustion engine to receive power from the internal combustion engine; and
  in at least one said mode coupled to deliver power to the refrigeration system;
 an electric motor (72; 320) in at least one said mode coupled to the compressor to drive the compressor; and
 a generator (322), wherein the generator is in addition to an alternator or a generator providing electrical energy to the internal combustion engine, and in at least one said mode is:
  coupled to the internal combustion engine to be driven by the internal combustion engine; and
  coupled to the electric motor to power the electric motor (320) to drive the compressor.

2. The system of claim 1 further comprising:
 a belt (80) coupling the electric motor and the flywheel energy storage device to the compressor and the engine.

3. The system of claim 1 wherein:
 the internal combustion engine is coupled to mechanically drive the compressor in at least one said mode.

4. The system of claim 1 further comprising:
 a clutch (68) mechanically coupling the internal combustion engine to the compressor in at least one said mode.

5. The system of claim 1 further comprising:
 a belt coupling the refrigeration system and the flywheel energy storage device to the engine.

6. The system of claim 1 further comprising:
 the flywheel energy storage device has magnetic bearings (130).

7. The system of claim 1 further comprising:
 an electrical connection (78) for connecting to an external electric power source (74).

8. The system of claim 1 further comprising:
 a continuously variable transmission (120) coupled to the flywheel energy storage device.

9. The system of claim 1 wherein the engine is not a propulsion engine.

10. The system of claim 1 wherein the container is:
 a truck cargo box;
 a trailer box; or
 an intermodal container.

11. The system of claim 1 further comprising a controller (200) configured to:
 operate the system in a normal energy-storing mode wherein:
  the internal combustion engine supplies power to the refrigeration system; and
  the internal combustion engine supplies power to charge the flywheel energy storage device; and
 operate the system in a recovered energy mode wherein:
  the flywheel energy storage device discharges to power the refrigeration system.

12. The system of claim 11 wherein the controller is further configured to:
 vary a ratio of a continuously variable transmission (120) to control a charging or a discharging of the flywheel energy storage device.

13. A method for using the system of claim 1, the method comprising:
 operating the system in a normal energy-storing mode wherein:
  the internal combustion engine supplies power to the refrigeration system; and
  the internal combustion engine supplies power to charge the flywheel energy storage device; and
 operating the system in a recovered energy mode wherein:
  the flywheel energy storage device discharges to power the refrigeration system.

14. The method of claim 13 further comprising:
 operating the system in a plugged-in standby energy storing mode wherein:

an external electric power source (74) powers the refrigeration system and stores energy in the flywheel energy storage device.

15. The method of claim 14 further comprising:
operating the system in a plugged-in standby recovered energy mode wherein:
the external electric power source (74) powers the refrigeration system and the flywheel energy storage device discharges to power the refrigeration system.

16. The method of claim 13 comprising:
switching between the recovered energy mode and the energy storing mode by varying a ratio of a continuously variable transmission (120).

17. The method of claim 13 further comprising:
locking and unlocking a clutch (122) coupling the flywheel energy storage device (70) to other components of the system.

18. The method of claim 17 wherein:
a transmission (120) couples the flywheel energy storage device to the clutch.

19. The method of claim 17 wherein:
the clutch couples the flywheel energy storage device to at least one of:
an electric motor (72);
a generator (226); and
an alternator (420).

20. A method for using a system, the system operable in a plurality of modes, the system comprising:
a container having an interior;
an internal combustion engine;
a refrigeration system, in at least one said mode coupled to the internal combustion engine to receive power and thermally coupled to the container to cool the container interior; and
a flywheel energy storage device:
in at least one said mode coupled to the internal combustion engine to receive power from the internal combustion engine; and
in at least one said mode coupled to deliver power to the refrigeration system;
the method comprising:
operating the system in a normal energy-storing mode wherein:
the internal combustion engine supplies power to the refrigeration system; and
the internal combustion engine supplies power to charge the flywheel energy storage device;
operating the system in an recovered energy mode wherein:
the flywheel energy storage device discharges to power the refrigeration system; and
operating the system in a plugged-in standby energy storing mode wherein:
an external electric power source powers the refrigeration system and stores energy in the flywheel energy storage device.

21. The method of claim 20 further comprising:
operating the system in a plugged-in standby recovered energy mode wherein:
the external electric power source powers the refrigeration system and the flywheel energy storage device discharges to power the refrigeration system.

22. A method for using a system, the system operable in a plurality of modes, the system comprising:
a container having an interior;
an internal combustion engine;
a refrigeration system, in at least one said mode coupled to the internal combustion engine to receive power and thermally coupled to the container to cool the container interior; and
a flywheel energy storage device:
in at least one said mode coupled to the internal combustion engine to receive power from the internal combustion engine; and
in at least one said mode coupled to deliver power to the refrigeration system;
the method comprising:
operating the system in a normal energy-storing mode wherein:
the internal combustion engine supplies power to the refrigeration system; and
the internal combustion engine supplies power to charge the flywheel energy storage device;
operating the system in a recovered energy mode wherein:
the flywheel energy storage device discharges to power the refrigeration system; and
switching between the recovered energy mode and the energy storing mode by varying a ratio of a continuously variable transmission.

\* \* \* \* \*